United States Patent
Lin et al.

(10) Patent No.: US 8,399,143 B2
(45) Date of Patent: Mar. 19, 2013

(54) PLANAR SOFC STACK

(75) Inventors: Hung-Hsiang Lin, Taoyuan County (TW); Ruey-Yi Lee, Taoyuan County (TW); Yung-Neng Cheng, Taoyuan County (TW)

(73) Assignee: Atomic Energy Council—Institute of Nuclear Energy Research, Lungtan, Taoyuan (TW)

( * ) Notice: Subject to any disclaimer, the term of this patent is extended or adjusted under 35 U.S.C. 154(b) by 157 days.

(21) Appl. No.: 13/169,791

(22) Filed: Jun. 27, 2011

(65) Prior Publication Data

US 2012/0100453 A1 Apr. 26, 2012

(30) Foreign Application Priority Data

Oct. 21, 2010 (TW) ............................... 99135883 A

(51) Int. Cl.
*H01M 8/24* (2006.01)
*H01M 2/40* (2006.01)

(52) U.S. Cl. ..................... 429/471; 429/459; 429/470

(58) Field of Classification Search ................ 429/459, 429/470, 471
See application file for complete search history.

(56) References Cited

U.S. PATENT DOCUMENTS

| | | | |
|---|---|---|---|
| 6,218,039 B1 * | 4/2001 | Mease et al. | 429/470 |
| 2008/0038622 A1 * | 2/2008 | Valensa et al. | 429/38 |
| 2008/0280178 A1 * | 11/2008 | Spink et al. | 429/26 |
| 2011/0183229 A1 * | 7/2011 | Fontell et al. | 429/458 |

* cited by examiner

*Primary Examiner* — Nicholas P D'Aniello
(74) *Attorney, Agent, or Firm* — Jackson IPG PLLC

(57) ABSTRACT

A solid oxide fuel cell ("SOFC") stack device is disclosed. The SOFC stack includes SOFC units that can easily be stacked and electrically connected to one another. Furthermore, each of the SOFC units can easily be removed from the others and replaced with a new one. The fuel cell stack includes a supporting mechanism and two conducting and pressing units. The supporting mechanism includes three parts. Each part of the supporting mechanism includes slots defined therein for receiving the SOFC units. Each of the conducting and pressing units is located between two adjacent ones of the parts of the supporting mechanism.

7 Claims, 5 Drawing Sheets

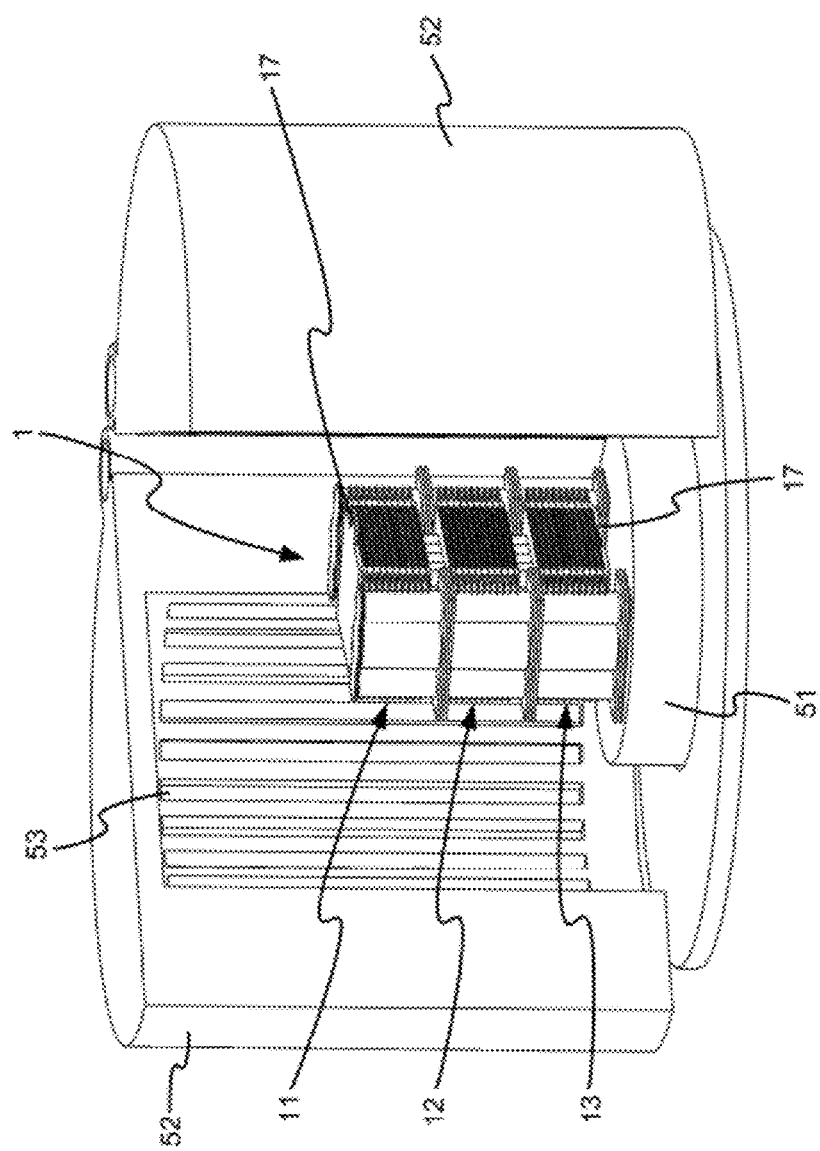

PLANAR SOFC STACK

BACKGROUND OF INVENTION

1. Field of Invention

The present invention relates to a planar solid oxide fuel cell ("SOFC") stack and, more particularly, to a planar SOFC stack including planar SOFC units that can easily be piled up and replaced with new ones.

2. Related Prior Art

To provide an adequate amount of electricity, several to tens of planar SOFC units are stacked and electrically connected to one another in serial. Thus, the planar SOFC units together form a planar SOFC stack. The planar SOFC units are secured to one another conventionally. Hence, the process for interconnecting the planar SOFC units is complicated. Furthermore, it is difficult to remove any of the planar SOFC units when it is out of order. Of course, it is difficult to replace the broken planar SOFC unit with a new one.

The present invention is therefore intended to obviate or at least alleviate the problems encountered in prior art.

SUMMARY OF INVENTION

It is the primary objective of the present invention to provide a planar SOFC stack including planar SOFC units that can easily be piled up and replaced with new ones.

To achieve the foregoing objective, the fuel cell stack includes a supporting mechanism and two conducting and pressing units. The supporting mechanism includes three stacking units and three gas-distributing units. The first stacking unit includes slots defined therein and separated from one another by boards. The lowermost board includes positioning apertures in communication with the lowermost slot. The first gas-distributing unit is connected to the first stacking unit and formed with an inlet pipe and an outlet pipe. The second stacking unit includes slots defined therein and separated from one another by boards. The uppermost board of the second stacking unit includes positioning apertures in communication with the uppermost slot of the second stacking unit. The lowermost board of the second stacking unit includes positioning apertures in communication with the lowermost slot of the second stacking unit. The second gas-distributing unit is connected to the second stacking unit and formed with an inlet pipe and an outlet pipe. The third stacking unit including slots defined therein and separated from one another by boards. The uppermost board of the third stacking unit includes positioning apertures in communication with the uppermost slot of the third stacking unit. The third gas-distributing unit is connected to the third stacking unit and formed with an inlet pipe and an outlet pipe. The first pressing and conducting unit includes an upper plate inserted in the lowermost slot of the first stacking unit, a lower plate inserted in the uppermost slot of the second stacking unit; and conductive elastic elements inserted through the positioning apertures defined in the lowermost board of the first stacking unit and the positioning apertures defined in the uppermost board of the second stacking unit and compressed between the upper and lower plates thereof. The second pressing and conducting unit includes an upper plate inserted in the lowermost slot of the second stacking unit, a lower plate inserted in the uppermost slot of the third stacking unit, and conductive elastic elements inserted through the positioning apertures defined in the lowermost board of the second stacking unit and the positioning apertures defined in the uppermost board of the third stacking unit and compressed between the upper and lower plates thereof. Each of the fuel cell units is inserted in a related one of the slots.

In an aspect, each of the first and third stacking units includes a load-contacting tab extending from one of the boards thereof.

In another aspect, the supporting mechanism further includes a sealing gasket sandwiched between the first and second gas-distributing units and another sealing gasket sandwiched between the second and third gas-distributing units.

In another aspect, the first, second and third gas-distributing units are made of a material selected from the group consisting of metal and ceramics.

In another aspect, the conductive elastic elements are conductive springs.

In another aspect, the fuel cell stack further includes isolative sleeves each for wrapping a related one of the conductive springs.

In another aspect, each of the fuel cell units includes a sealing gasket, a cathode gas-guiding plate located on the sealing gasket, a first metal net located on the cathode gas-guiding plate, a second sealing gasket located on the first metal net, a fuel cell located on the second sealing gasket, a third sealing gasket located on the fuel cell, a second metal net located on the third sealing gasket, an anode gas-guiding plate located on the second metal net, and a fourth sealing gasket located on the anode gas-guiding plate.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein:

FIG. 5 is a perspective view of an oven equipped with the planar SOFC stack shown in FIG. 1.

DETAILED DESCRIPTION OF PREFERRED EMBODIMENT

Figure 1:
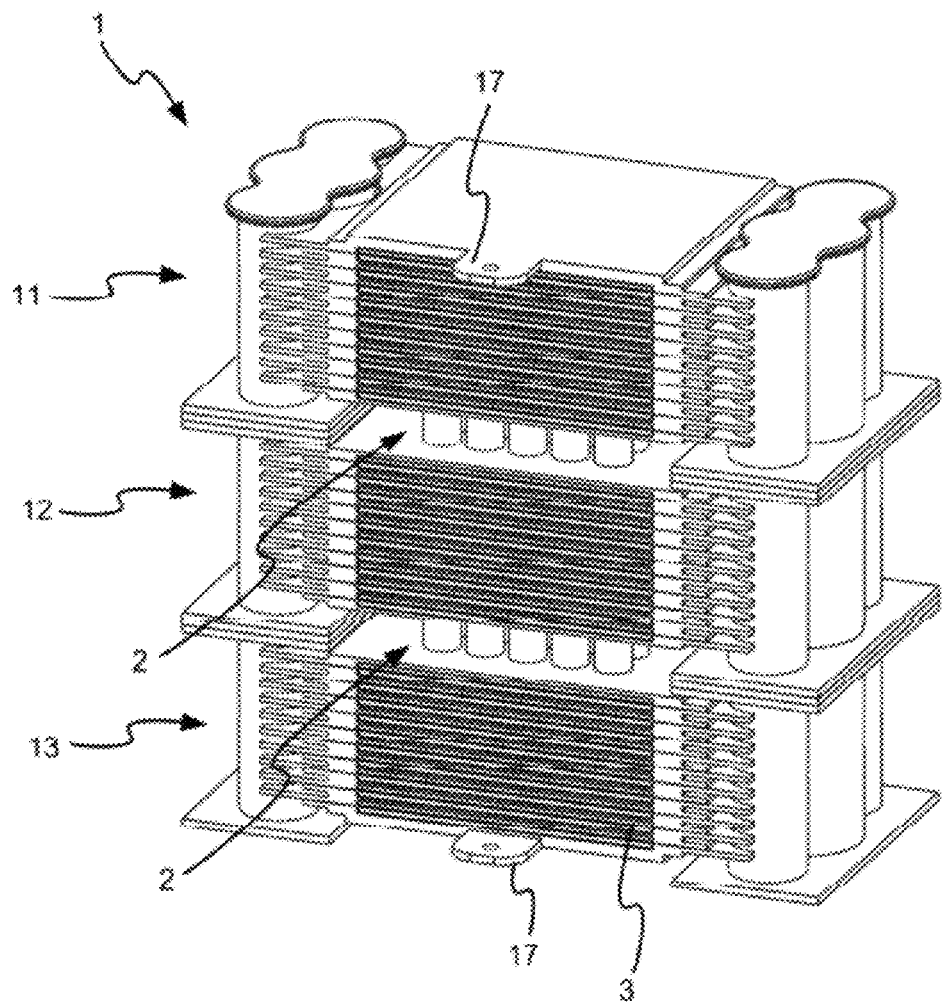
FIG. 1 is a perspective view of a planar SOFC stack according to the preferred embodiment of the present invention.
Figure 2:
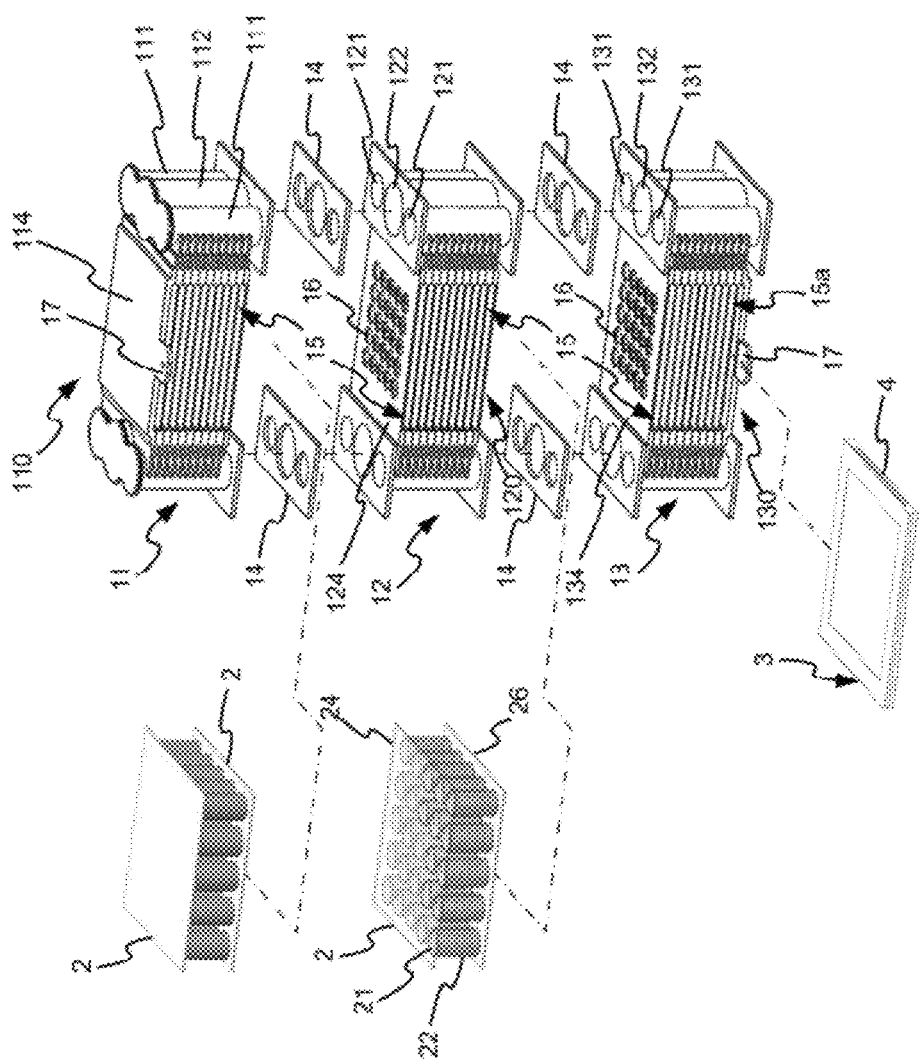
FIG. 2 is an exploded view of the planar SOFC stack shown in FIG. 1.
Figure 3:
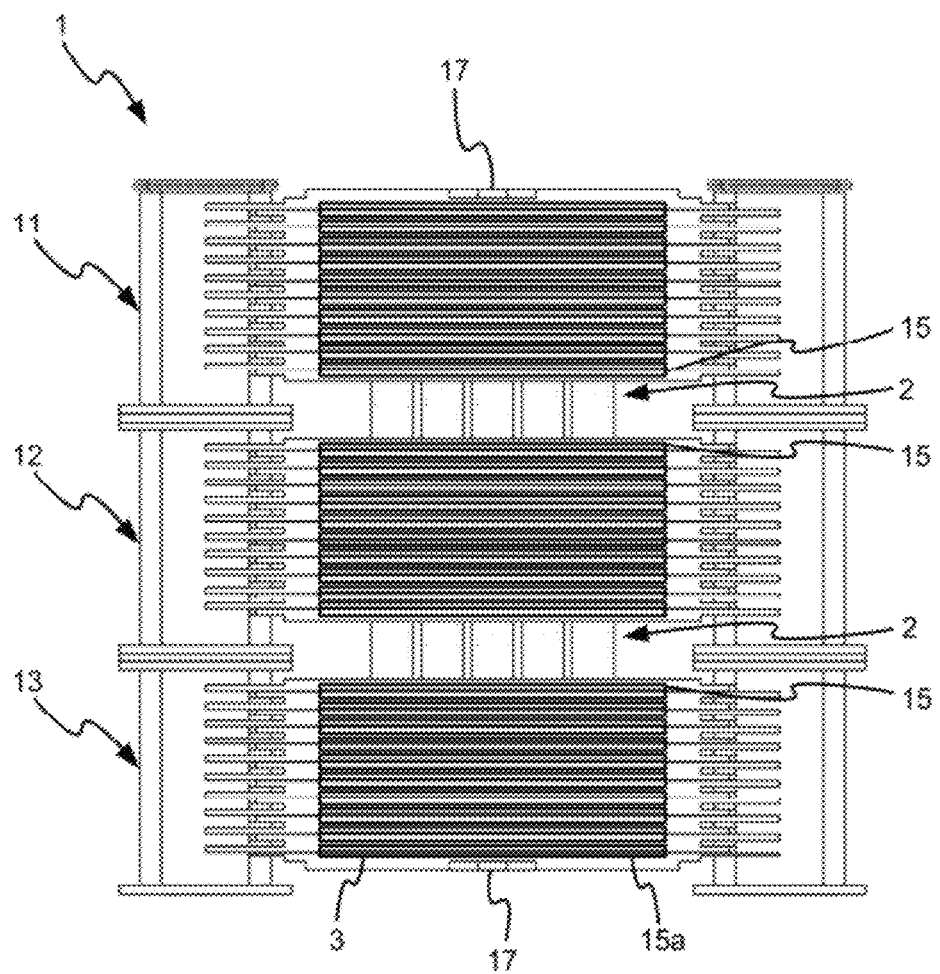
FIG. 3 is a front view of the planar SOFC stack shown in FIG. 1.

Referring to FIGS. 1 and 3, there is shown a planar SOFC stack according to the preferred embodiment of the present invention. The planar SOFC stack includes a supporting mechanism 1, two pressing and conducting units 2 and planar SOFC units 3. The supporting mechanism 1 includes three parts that are manufactured separately and connected to one another.

The first part of the supporting mechanism 1 includes a stacking unit 110 formed between two gas-distributing units 11. The gas-distributing units 11 may be made of metal or ceramics. Each of the gas-distributing units 11 includes two inlet pipes 111 and an outlet pipe 112. The axes of the pipes 111 and 112 extend vertically and parallel to one another.

The stacking unit 110 includes slots 15 defined therein and separated from one another by boards 114. The boards 114 extend horizontally. The uppermost board 114 includes a load-contacting tab 17 extending from a front edge thereof.

The lowermost board 114 includes positioning apertures 16 in communication with the lowermost slot 15.

The second part of the supporting mechanism 1 includes a stacking unit 120 formed between two gas-distributing units 12. The gas-distributing units 12 may be made of metal or ceramics. Each of the gas-distributing units 12 includes two inlet pipes 121 and an outlet pipe 122. The axes of the pipes 121 and 122 extend vertically and parallel to one another.

The stacking unit 120 includes slots 15 defined therein and separated from one another by boards 124. The boards 124 extend horizontally. The uppermost board 124 includes positioning apertures 16 in communication with the uppermost the slot 15 defined in the stacking unit 120. The lowermost board 124 includes positioning apertures 16 in communication with the lowermost slot 15 defined in the stacking unit 120.

The third unit of the supporting mechanism 1 includes a stacking unit 130 formed between two gas-distributing units 13. Each of the gas-distributing units 13 includes two inlet pipes 131 and an outlet pipe 132. The axes of the pipes 131 and 132 extend parallel to one another.

The stacking unit 130 includes slots 15 defined therein and separated from one another by boards 134. The boards 134 extend horizontally. The uppermost board 134 includes positioning apertures 16 in communication with the lowermost slot 15. The lowermost board 134 includes a load-contacting tab 17 extending from a front edge thereof.

The supporting mechanism 1 further includes two upper gaskets 14 and two lower gaskets 14. Each of the upper and lower gaskets 14 includes an outlet aperture defined therein corresponding to the outlet pipes 112, 122 and 132 and two inlet apertures defined therein corresponding to the inlet pipes 111, 121 and 131.

Each of the pressing and conducting units 2 includes conductive elastic elements 21 located between an upper plate 24 and a lower plate 26. The conductive elastic elements 21 may be helical springs made of metal. Each of the conductive elastic elements 21 is wrapped by an isolative sleeve 22.

Figure 4:
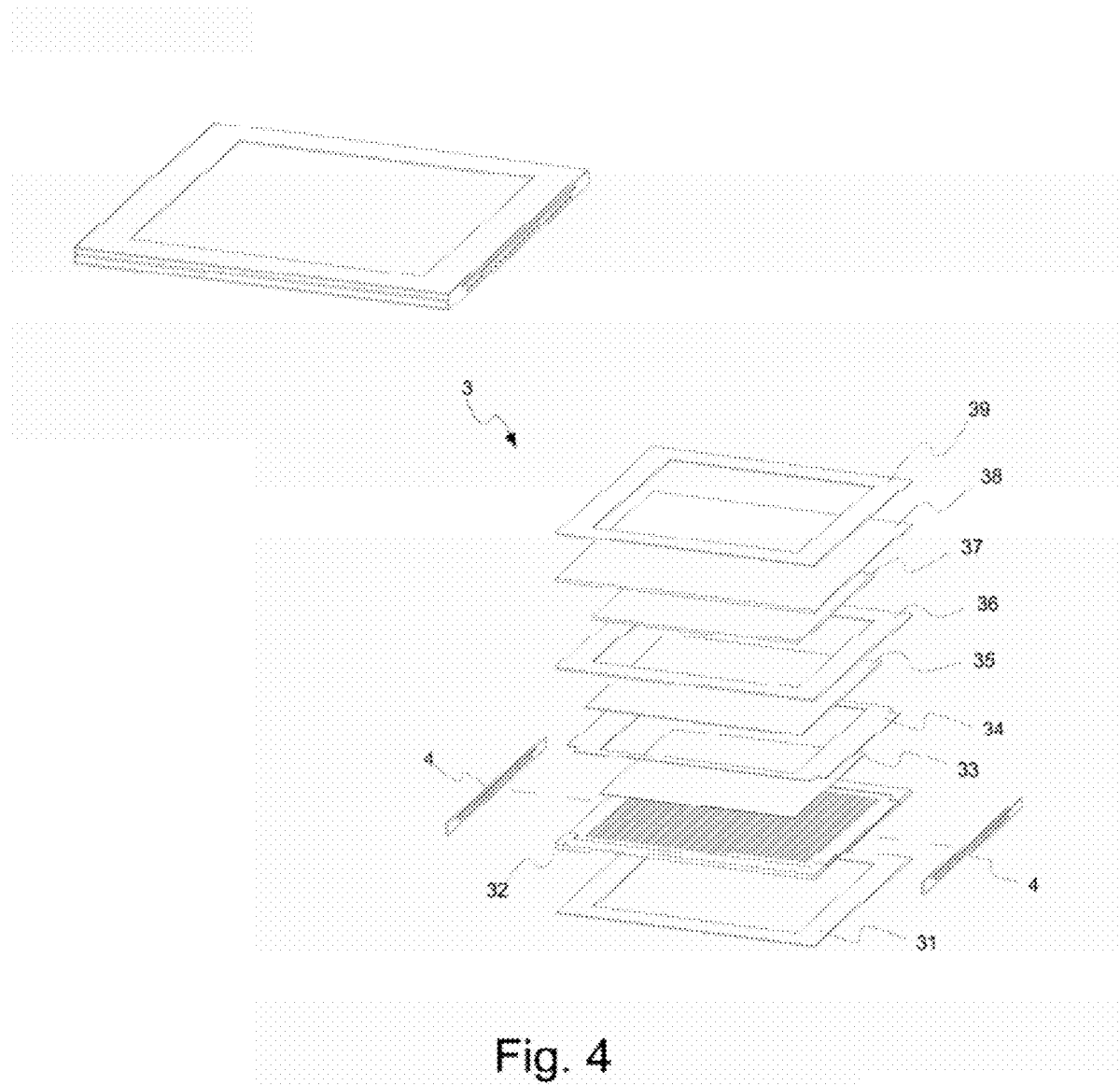
FIG. 4 is an exploded view of a planar SOFC unit of the planar SOFC stack shown in FIG. 1.

Referring to FIG. 4, each of the planar SOFC units 3 includes a sealing gasket 31, a cathode gas-guiding plate 32, a first metal net 33, a second sealing gasket 34, a solid oxide fuel cell 35, a third sealing gasket 36, a second metal net 37, an anode gas-guiding plate 38 and a fourth sealing gasket 39. Each of the planar SOFC units 3 is located between two lateral sealing gaskets 4.

In assembly, the upper plate 24 of the upper pressing and conducting unit 2 is located in the lowermost slot 15 defined in the stacking unit 110 while the lower plate 26 of the upper pressing and conducting unit 2 is located in the uppermost slot 15 defined in the stacking unit 120. The conductive elastic elements 21 of the upper pressing and conducting unit 2 are compressed between the plates 24 and 26 of the upper pressing and conducting unit 2 as the first part of the supporting device is located on the second part of the supporting device. Each of the upper gaskets 14 is located between a related one of the gas-distributing units 11 and a related one of the gas-distributing units 12.

The upper plate 24 of the lower pressing and conducting unit 2 is located in the lowermost slot 15 defined in the stacking unit 120 while the lower plate 26 of the lower pressing and conducting unit 2 is located in the uppermost slot 15 defined in the stacking unit 130. The conductive elastic elements 21 of the lower pressing and conducting unit 2 are compressed between the plates 24 and 26 of the lower pressing and conducting unit 2 as the second part of the supporting device is located on the third part of the supporting device 1.

Each of the lower gaskets 14 is located between a related one of the gas-distributing units 12 and a related one of the gas-distributing units 13.

Finally, each of the planar SOFC units 3 is inserted in a related one of the slots 15. Moreover, each of the planar SOFC units 3 is electrically connected to one another.

Referring to FIG. 5, in operation, the planar SOFC stack is located in a high-temperature oven 5 for example. The oven 5 includes a platform 51, two covers 52 and two groups of thermal coils 53. The covers 52 are pivotally supported on the platform 51. Each of the groups of thermal coils 53 is supported on an internal face of a related one of the covers 52. Initially, the covers 52 are pivoted from each other so that the high-temperature oven 5 is opened. The planar SOFC stack is supported on the platform 51. The covers 52 are pivoted to each other so that the high-temperature oven 5 is closed. The thermal coils 53 are turned on.

Reaction gases are introduced in the planar SOFC stack through the inlet pipes 111, 121 and 131 of the gas-distributing units 11, 12 and 13, respectively. The planar SOFC units 3 cause the reaction gases to react with one another. During the reaction, the sealing gaskets 4 keep the reaction gases in the planar SOFC units 3. Then, exhaust is released from the planar SOFC stack through the outlet pipes 112, 122 and 132 of the gas-distributing units 11, 12 and 13, respectively.

To replace a used planar SOFC unit 3 with a new one, the used planar SOFC unit 3 is simply removed from the related slot 15 and then the new planar SOFC unit 3 is inserted in the related slot 15. The new planar SOFC unit 3 is electrically connected to the other SOFC units 3.

As discussed above, the process for interconnecting the planar SOFC units 3 is simple and easy. Furthermore, it is easy to remove any of the planar SOFC units 3 and replace it with a new one.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A fuel cell stack including:
    a supporting mechanism 1 including
        a first stacking unit 110 including slots 15 defined therein and boards 114 for separating the slots 15 from one another, wherein the lowermost board 114 includes positioning apertures 16 in communication with the lowermost slot 15;
        a first gas-distributing unit 11 connected to the first stacking unit 110 and formed with an inlet pipe 111 and an outlet pipe 112;
        a second stacking unit 120 including slots 15 defined therein and boards 124 for separating the slots 15 thereof from one another, wherein the uppermost board 124 of the second stacking unit 120 includes positioning apertures 16 in communication with the uppermost slot 15 of the of the second stacking unit 120, wherein the lowermost board 124 of the second stacking unit 120 includes positioning apertures 16 in communication with the lowermost slot 15 of the second stacking unit 120;
        a second gas-distributing unit 12 connected to the second stacking unit 120 and formed with an inlet pipe 121 and an outlet pipe 122;
        a third stacking unit 130 including slots 15 defined therein and boards 134 for separating the slots 15 thereof from one another, wherein the uppermost board 134 of the third stacking unit 130 includes positioning apertures 16 in communication with the uppermost slot 15 of the third stacking unit 130;

a third gas-distributing unit 13 connected to the third stacking unit 130 and formed with an inlet pipe 111 and an outlet pipe 112;

a first pressing and conducting unit 2 including:
- an upper plate 24 inserted in the lowermost slot 15 of the first stacking unit 110;
- a lower plate 26 inserted in the uppermost slot 15 of the second stacking unit 120; and
- conductive elastic elements 21 inserted through the positioning apertures defined in the lowermost board 114 of the first stacking unit 110 and the positioning apertures 16 defined in the uppermost board 124 of the second stacking unit 120 and compressed between the upper and lower plates 24, 26 thereof;

a second pressing and conducting unit 2 including:
- an upper plate 24 inserted in the lowermost slot 15 of the second stacking unit 120;
- a lower plate 26 inserted in the uppermost slot 15 of the third stacking unit 130; and
- conductive elastic elements 21 inserted through the positioning apertures 16 defined in the lowermost board 124 of the second stacking unit 120 and the positioning apertures 15 defined in the uppermost board 134 of the third stacking unit 130 and compressed between the upper and lower plates 24, 26 thereof; and fuel cell units 3 each inserted in a related one of the slots 15.

2. The fuel cell stack according to claim 1, wherein each of the first and third stacking units 110, 130 includes a load-contacting tab 17 extending from one of the boards 114, 134 thereof.

3. The fuel cell stack according to claim 1, wherein the supporting mechanism 1 further includes a sealing gasket 14 sandwiched between the first and second gas-distributing units 11, 12 and another sealing gasket 14 sandwiched between the second and third gas-distributing units 12, 13.

4. The fuel cell stack according to claim 1, wherein the first, second and third gas-distributing units 11, 12 and 13 are made of a material selected from the group consisting of metal and ceramics.

5. The fuel cell stack according to claim 1, wherein the conductive elastic elements 21 are conductive springs.

6. The fuel cell stack according to claim 5, further including isolative sleeves 22 each for wrapping a related one of the conductive springs 21.

7. The fuel cell stack according to claim 1, wherein each of the fuel cell units 3 includes:
- a sealing gasket 31;
- a cathode gas-guiding plate 32 located on the sealing gasket 31;
- a first metal net 33 located on the cathode gas-guiding plate 32;
- a second sealing gasket 34 located on the first metal net 33;
- a fuel cell 35 located on the second sealing gasket 34;
- a third sealing gasket 36 located on the fuel cell 35;
- a second metal net 37 located on the third sealing gasket 36;
- an anode gas-guiding plate 38 located on the second metal net 37; and
- a fourth sealing gasket 39 located on the anode gas-guiding plate 38.

* * * * *